(12) United States Patent
Stupar et al.

(10) Patent No.: US 8,595,796 B2
(45) Date of Patent: Nov. 26, 2013

(54) APPARATUS AND METHOD FOR AUTHORIZATION FOR ACCESS POINT NAME (APN) USAGE IN A SPECIFIC ACCESS

(75) Inventors: Patrick Stupar, Nuremberg (DE); Chennagiri Krishna Subramanaya Pandit, Nuremberg (DE); Haipeng Jin, Carlsbad, CA (US); Gerardo Giaretta, San Diego, CA (US); Arungundram C. Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 764 days.

(21) Appl. No.: 12/577,646

(22) Filed: Oct. 12, 2009

(65) Prior Publication Data

US 2011/0088080 A1 Apr. 14, 2011

(51) Int. Cl.
*H04L 29/06* (2006.01)
*G06F 21/00* (2013.01)

(52) U.S. Cl.
USPC .............................................. 726/4; 380/247

(58) Field of Classification Search
None
See application file for complete search history.

(56) References Cited

U.S. PATENT DOCUMENTS

| 7,516,211 B1* | 4/2009 | Gourlay et al. ............... 709/224 |
| 2004/0047348 A1 | 3/2004 | O'neill |
| 2004/0177276 A1* | 9/2004 | MacKinnon et al. ......... 713/201 |
| 2006/0133319 A1 | 6/2006 | Kant |
| 2007/0249323 A1* | 10/2007 | Lee et al. ...................... 455/411 |
| 2009/0061869 A1 | 3/2009 | Bui et al. |
| 2009/0286512 A1* | 11/2009 | Huber et al. .................. 455/411 |

FOREIGN PATENT DOCUMENTS

| JP | 2003338833 A | 11/2003 |
| JP | 2006262379 A | 9/2006 |
| JP | 2007043255 A | 2/2007 |
| WO | 2007043201 A1 | 4/2007 |
| WO | 2009068076 A1 | 6/2009 |
| WO | 2009087099 A1 | 7/2009 |

OTHER PUBLICATIONS

Perkins, C. IP Mobility Support for IPv4, Aug. 2002 [retrieved on Aug. 19, 2013], Retrieved from the Internet: URL:http://tools.ietf.org/html/rfc3344.*
International Search Report and Written Opinion—PCT/US2010/052380—ISA/EPO—Apr. 5, 2011.
Perkins C., et al., "IP Mobility Support for IPv4- rfc3344.txt" IETF'Standard Internet Engineering Task Force, IETF, CH, Aug. 1, 2002, XP015009105 ISSN: 0000-0003 abstract paragraphs [01.5], [01.6], [3.6.1.1].
Taiwan Search Report—TW099134781—TIPO—Jun. 11, 2013.
3GPP: "3GPP TS 23.402 V2.0.0 (Dec. 2007); Technical Specification Group Services and System Aspects; Architecture enhancements for non-SGPP accesses (Release 8)", Dec. 2007, pp. 128.

(Continued)

*Primary Examiner* — Gilberto Barron, Jr.
*Assistant Examiner* — Malcolm Cribbs
(74) *Attorney, Agent, or Firm* — Darren M. Simon

(57) ABSTRACT

An apparatus and method for receiving a request for authorization and access from a requestor; determining the association of a care-of-address (CoA) in the request with an access technology used by the requestor; administering authorization rules based on the association of the care-of-address (COA) and the access technology; and determining either to allow access or to deny access to the requestor using results from administering the authorization rules.

28 Claims, 12 Drawing Sheets

(56) References Cited

OTHER PUBLICATIONS

3GPP TS 23.203 V8.7.0: "3rd Generation Partnership Project; Technical Specification Group Services and System Aspects: Policy and charging control architecture (Release 8)," Sep. 2009, pp. 114.

3GPP TS 23.401 V8.0.0: "3rd Generation Partnership Project; Technical Specification Group Radio Access Network; General Packet Radio Service (GPRS) enhancements for Evolved Universal Terrestrial Radio Access Network (E-UTRAN) access (Release 8)", (Dec. 2007), pp. 167, XP007903984.

* cited by examiner

APPARATUS AND METHOD FOR AUTHORIZATION FOR ACCESS POINT NAME (APN) USAGE IN A SPECIFIC ACCESS

FIELD

This disclosure relates generally to apparatus and methods for authorization in a wireless communication system. More particularly, the disclosure relates to authorization techniques for access point name (APN) usage in a specific access.

BACKGROUND

Communications networks are used to exchange messages among several interacting, spatially-separated elements. Networks may be classified by different attributes. For example, the geographic span of the network could be over a wide area, a metropolitan area, a local area, or a personal area, and the corresponding networks would be denoted as wide area network (WAN), metropolitan area network (MAN), local area network (LAN), or personal area network (PAN). Networks also differ in the switching/routing technique used to interconnect the various network nodes and devices (e.g. circuit switching vs. packet switching), in the type of physical media employed for waveform propagation (e.g. wired vs. wireless), or in the set of communication protocols used (e.g. Internet protocol suite, SONET (Synchronous Optical Networking), Ethernet, Asynchronous Transfer Mode (ATM), etc.).

One important attribute of communications networks is the usage of wired or wireless media for signal transmission among the network constituents. For wired networks, tangible physical media such as copper wire, coaxial cable, fiber optic cable, etc. propagate guided electromagnetic waveforms which transport message traffic over a distance. Wired networks are a traditional form of communications networks and are typically favored for interconnection of fixed, high capacity network elements or for bulk data transfer. For example, fiber optic cables are often the preferred transmission media for very high throughput transport applications over long distances between large network hubs, for example, bulk data transport across or between continents over the Earth's surface.

Wireless networks, on the other hand, are often preferred when mobile elements which need dynamic connectivity are used or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. However, wireless propagation techniques require significant active resource management among the network users and high levels of mutual coordination and cooperation for compatible spectrum utilization. One such resource management issue is the authorization of users with a specific access type.

SUMMARY

Disclosed is an apparatus and method for authorization for access point name (APN) usage in a specific access. According to one aspect, a method for providing authorization for access point name (APN) usage in a specific access, the method comprising using a receiver for receiving a request for authorization and access from a requestor; determining the association of a care-of-address (CoA) in the request with an access technology used by the requestor; administering at least one authorization rule based on the association of the care-of-address (COA) and the access technology; and using a processing unit for determining either to allow access or to deny access to the requestor using results from the administering step.

According to another aspect, an apparatus for providing authorization for access point name (APN) usage in a specific access, the apparatus comprising a receiver for receiving a request for authorization and access from a requestor; and a processor coupled to a memory, wherein the memory contains program code executable by the processor for performing the following: a) determining the association of a care-of-address (CoA) in the request with an access technology used by the requestor; b) administering at least one authorization rule based on the association of the care-of-address (COA) and the access technology; and c) using a processing unit for determining either to allow access or to deny access to the requestor using results from administering the at least one authorization rule.

According to another aspect, an apparatus for providing authorization for access point name (APN) usage in a specific access, the apparatus comprising means for receiving a request for authorization and access from a requestor; means for determining the association of a care-of-address (CoA) in the request with an access technology used by the requestor; means for administering at least one authorization rule based on the association of the care-of-address (COA) and the access technology; and means for determining either to allow access or to deny access to the requestor using results from administering the at least one authorization rule.

According to another aspect, a computer-readable medium storing a computer program, wherein execution of the computer program is for: receiving a request for authorization and access from a requestor; determining the association of a care-of-address (CoA) in the request with an access technology used by the requestor; administering at least one authorization rule based on the association of the care-of-address (COA) and the access technology; and determining either to allow access or to deny access to the requestor using results from administering the at least one authorization rule.

Advantages of the present disclosure include the ability to correlate authorization with a specific access type for a user.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
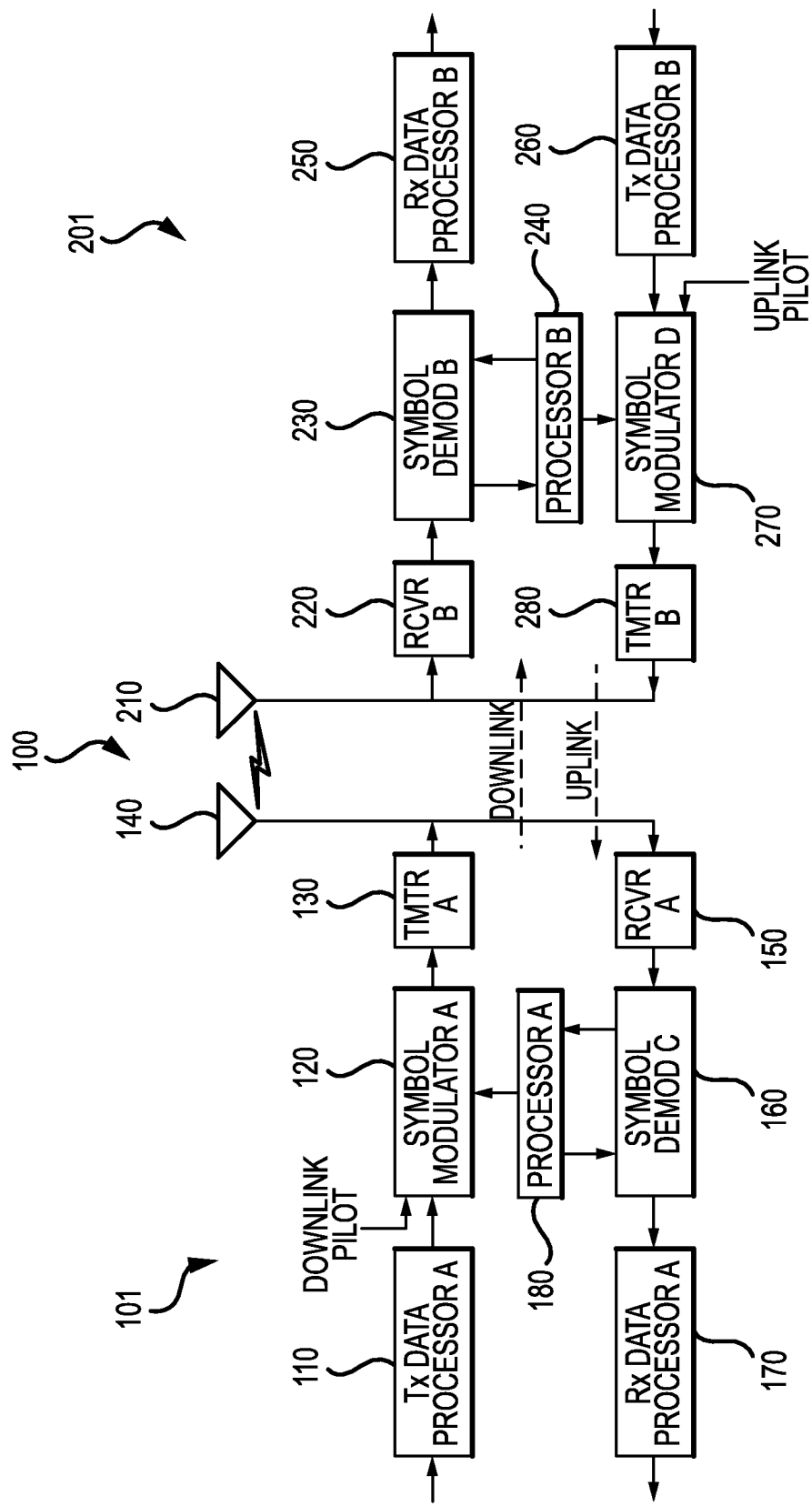
FIG. 1 is a block diagram illustrating an example access node/UE system.

FIG. 1 is a block diagram illustrating an example wireless network 100 (e.g., access node/UE system). One skilled in the art would understand that the example wireless network 100 illustrated in FIG. 1 may be implemented in a frequency division multiple access (FDMA) environment, an orthogonal frequency division multiple access (OFDMA) environment, a code division multiple access (CDMA) environment, a wideband code division multiple access (WCDMA) environment, a time division multiple access (TDMA) environment, a space division multiple access (SDMA) environment or any other suitable wireless environment.

The wireless network 100 includes an access node 101 (e.g., base station) and a user equipment or UE 201 (e.g., wireless communication device or mobile user device). In the downlink leg, the access node 101 (e.g., base station) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the wireless network 100 is a multiple-access system. The access technique includes the type of multiple access technology used to allow a plurality of users to simultaneously share the same allocated radio spectrum. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

An important consideration in the design of the wireless network 100 is the type of switching or routing technique used to interconnect wireless communication devices with other network users, both internal and external. Traditional wireless networks started with circuit-switched architectures, where fixed allocations of communication resources (e.g. frequency bands, time slots, CDMA codes, etc.) are allocated between network users for the duration of the communications session. More recently, wireless networks have been transitioning towards a packet-switched architecture, where communication resources are allocated as needed for each packet transmission. In these architectures, all messages are decomposed into a finite series of discrete packets which individually contain self-routing information. In this manner, packet-switched communication systems offer improved resource utilization and routing flexibility for most types of communications traffic. The self-routing information, typically contained in packet header fields, are used by various network nodes as forwarding information to determine the next routing path for each packet in turn.

In a wireless network which uses the Dual Stack Mobile Internet Protocol version 6 (DS-MIPv6) protocol, access authorization to specific services is performed in the Home Agent (HA), which is the DS-MIPv6 mobility anchor. However, this authorization process conventionally does not take into account the access network type for the user equipment (e.g., wireless communication device or mobile user device), since the network access authorization and the service authorization are distinct and uncorrelated, due to the DS-MIPv6 protocol itself. Additional features and protocols are needed if authorization to a specific service is dependent on the UE access method.

In one example, a wireless communication network is based on the ubiquitous Internet protocol (IP). Internet protocol (IP) provides a universal mechanism for routing data packets through any form of network which is compatible with IP. Though this mechanism, both wired and wireless networks with vastly different data rates, availabilities, error robustness, latencies, etc. may be interconnected. In particular, mobile user devices, also known as user equipment (UE), may use the Mobile IP version 6 (MIPv6) protocol, defined by Request for Comments (RFC) 3775, to connect to a wireless network and obtain IP access. In one example, MIPv6 enables the mobile user device mobility within different wireless access technologies. In one example, a Home Agent (HA) provides access to a packet data network or the Internet.

Disclosed herein, a wireless network includes provisions for authorization for network access. In this context, authorization governs specific access rights to network resources and services. In one example, an operator may need to enable or deny authorized connectivity to a certain access point name (APN) when the UE is accessing a certain access network or access technology. For example, a wireless operator may want to deny the usage of a corporate network APN when the UE is attached to a wireless local area network (WLAN).

In one example, for Dual Stack Mobile IP (DS-MIP), the enforcement point for APN authorization is the Home Agent (HA), since it is the element enforcing APN authorization. Dual stack refers to a dual capability to support both legacy IPv4 as well as the newer IPv6 protocols. In one example, the decision point may be the policy and charging rules function (PCRF) or the AAA. In one aspect, there is a procedure which indicates to the decision point the association between the care of address (CoA) and the access technology being used.

For example, the procedure may be a) AAA signaling based (optionally with UE signaling involvement), or b) policy and charging control (PCC) signaling based. In one aspect, different approaches have been considered depending on how and when the AAA/PCRF communicates to the HA the list of authorized accesses for a particular APN and how the decision point is informed about the association between CoA and access technology.

In one aspect, the policy and charging rules function (PCRF) is the policy entity that links the service and transport layers. The PCRF collates subscriber and application data, authorizes QoS resources, and instructs the transport plane on how to proceed with the underlying traffic. In another aspect, the policy and charging enforcement function (PCEF) resides on the traffic plane and is responsible for traffic detection and policy enforcement.

Disclosed herein as one example, a policy and charging control (PCC) based solution may be used for the association between CoA and access technology. The PCRF may push the blacklist of CoAs (i.e., forbidden CoAs) to the representative PCEF/HA, i.e., the HA bound to the APN that cannot be accessed by the UE from the access technology identified by those CoAs. Alternatively, the PCRF can wait for the PCEF/HA to start an IP-CAN (IP connectivity access network) session modification after the BU is received. In one example, the associated between CoA and technology is performed by the gateway control session.

Figure 2:
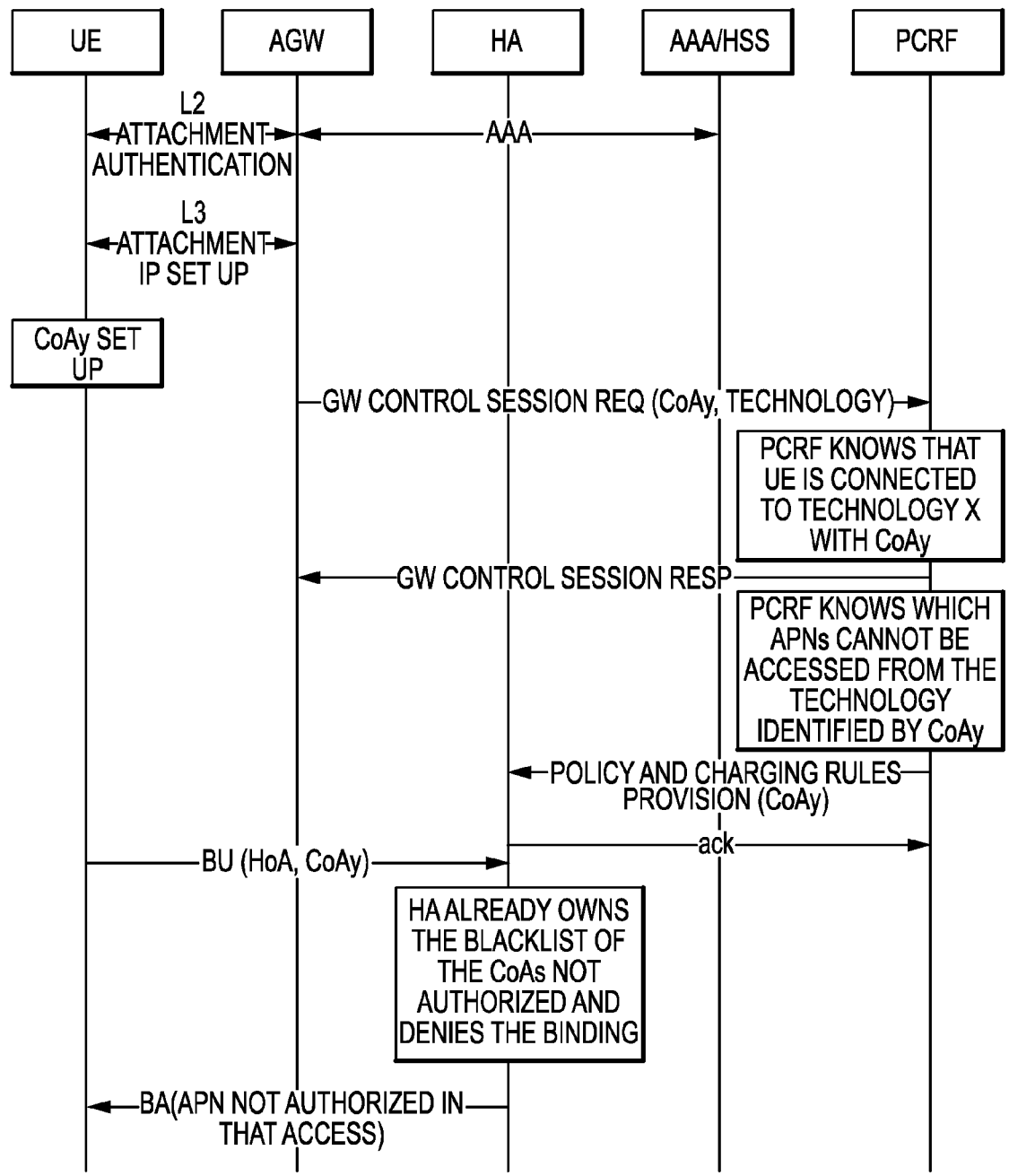
FIGS. 2-5 illustrate example policy and charging control (PCC) based solutions with different initiations for authorization.
Figure 3:
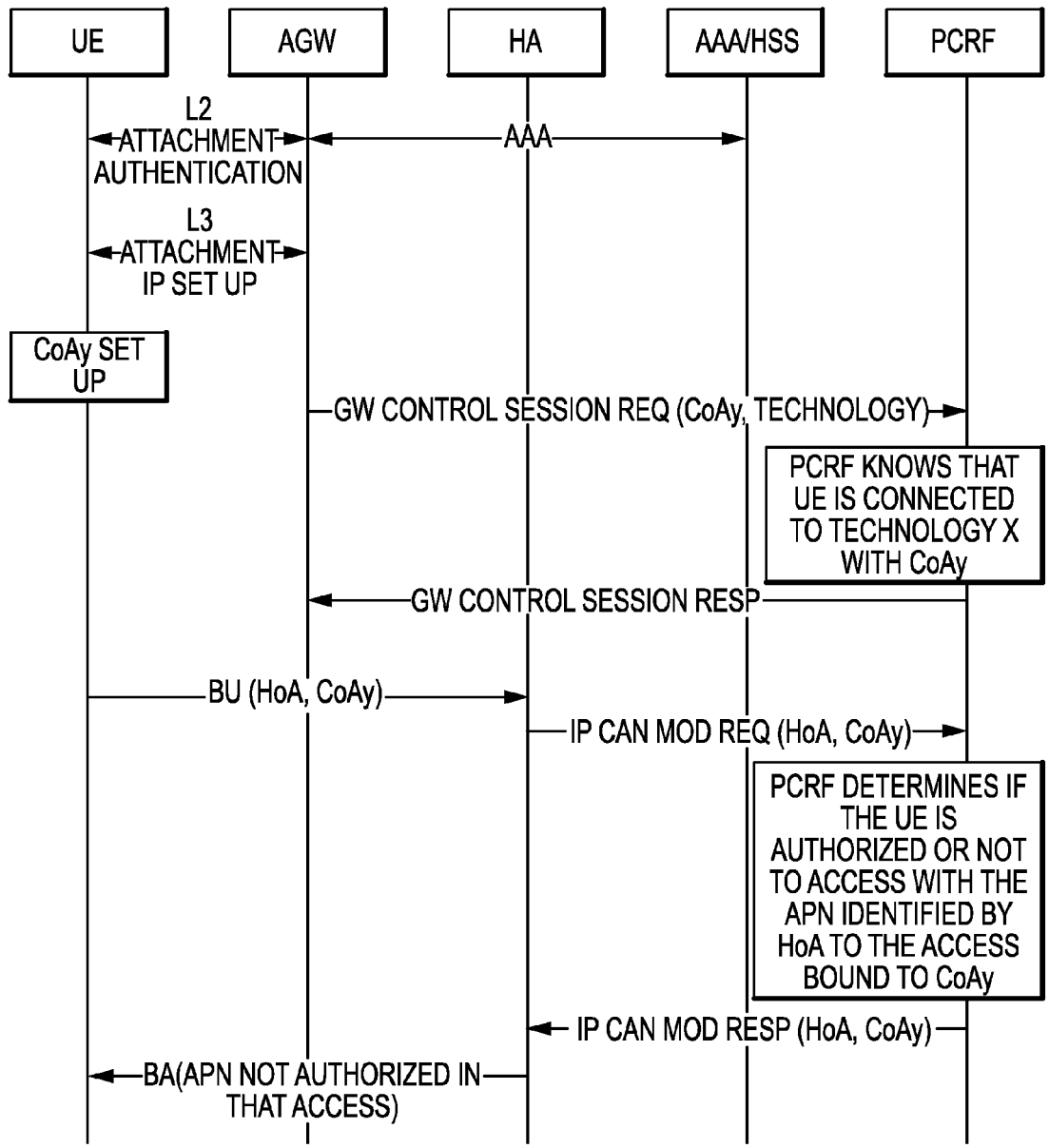
Figure 4:
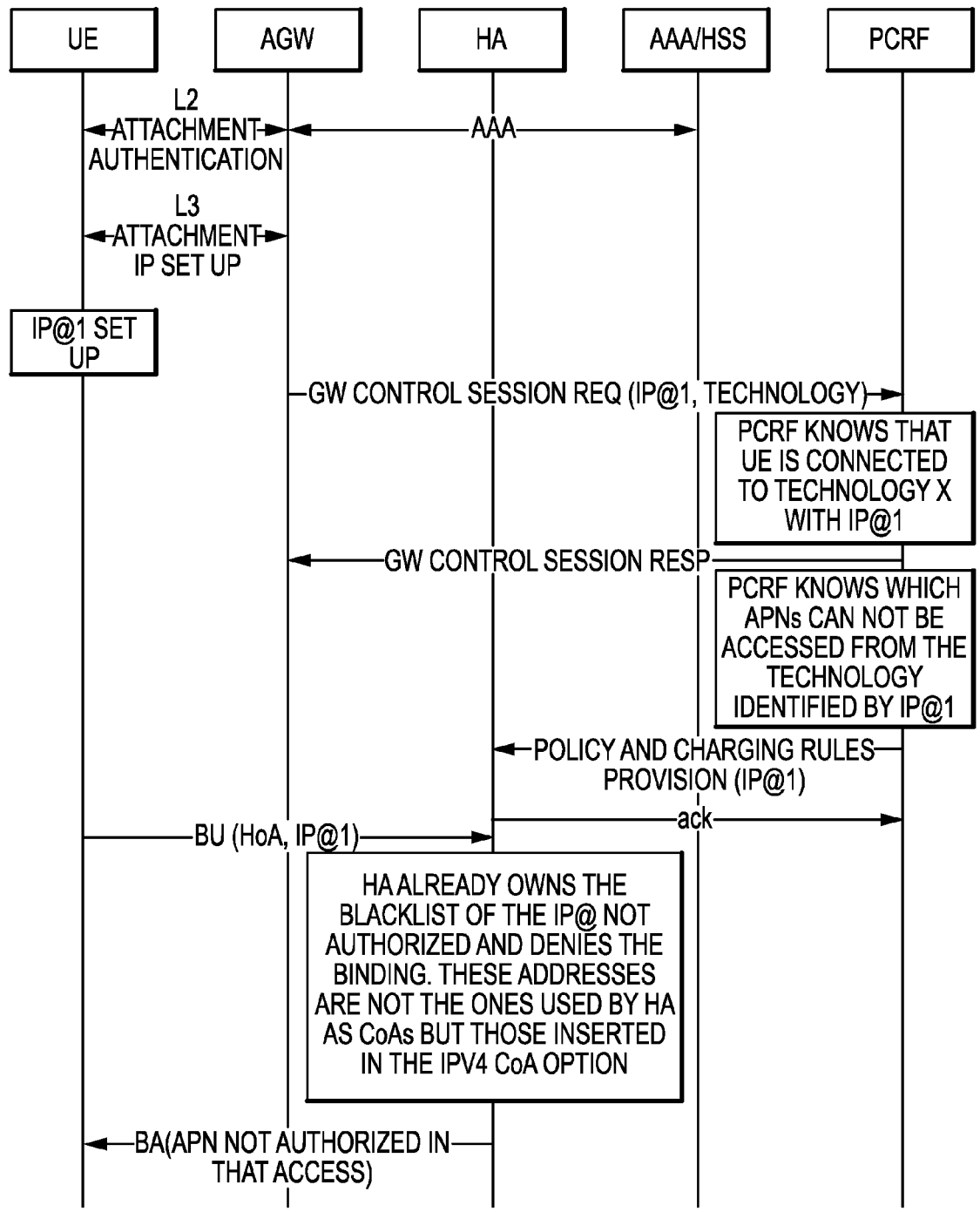
Figure 5:
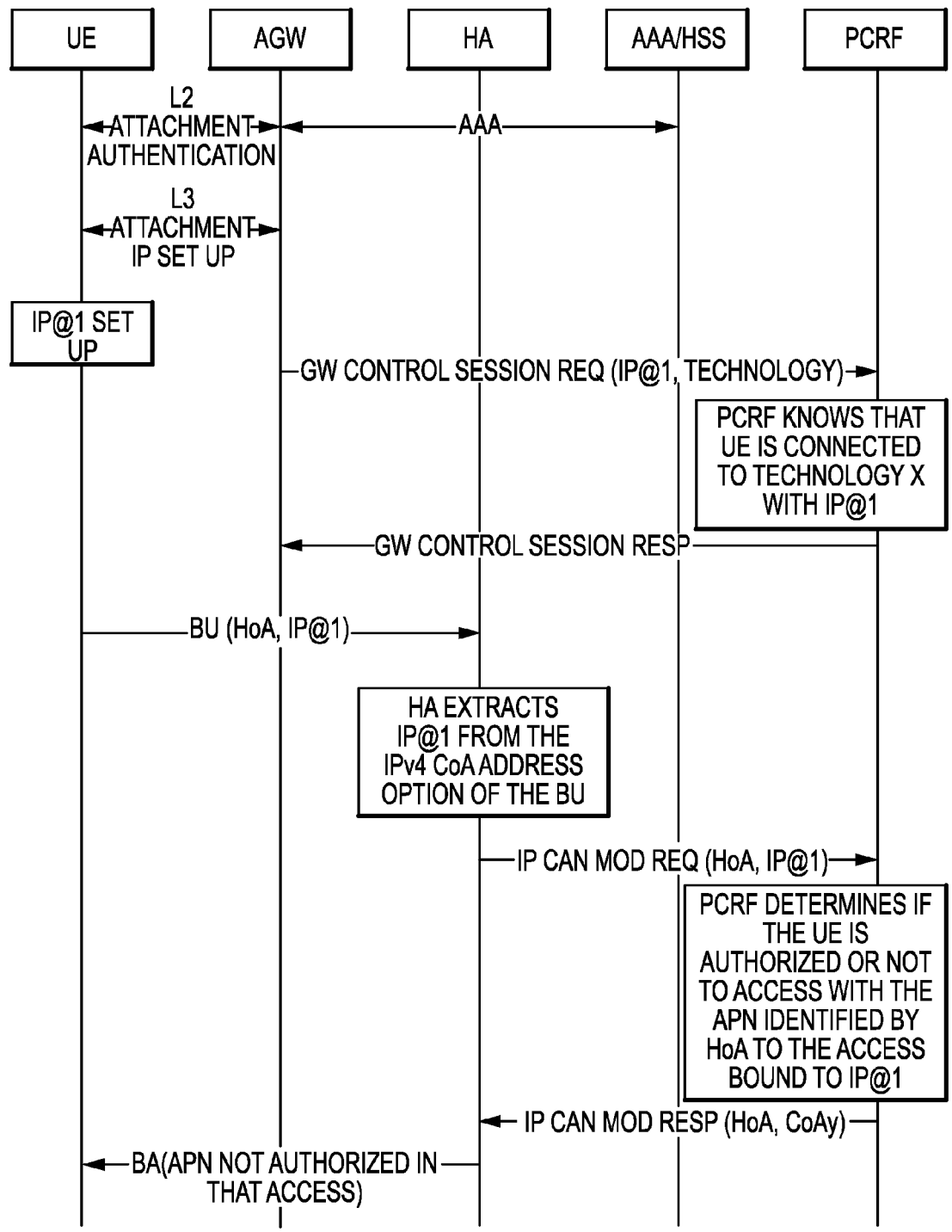

FIGS. 2-5 illustrate example policy and charging control (PCC) based solutions with different initiations for authorization. For example, FIG. 2 illustrates an example policy and charging control (PCC) based solution with policy and charging rules function (PCRF) initiation for authorization. FIG. 3 illustrates an example policy and charging control (PCC) based solution with policy and charging enforcement function (PCEF) initiation for authorization. FIG. 4 illustrates an example policy and charging control (PCC) based solution with policy and charging rules function (PCRF) initiation for authorization when network address translation (NAT) is deployed. FIG. 5 illustrates an example policy and charging control (PCC) based solution with policy and charging enforcement function (PCEF) initiation for authorization when network address translation (NAT) is deployed.

In one example, if network address translation (NAT) is used, the IP address provided by the AGW may be different than the CoA used by the HA. That is, the IP address set up by the UE may not be the CoA. The address provided by the AGW is the one inserted in the IPv4 CoA option of the Binding Update message (BU) built and sent by the UE. The HA and PCRF can use this information to perform authorization of APN in a defined access.

In one aspect, an alternative to the above PCC-based solution lacks is the usage of the AAA for the association between the CoA and the correspondent technology. Two examples for achieving the communication procedure include: a) access with AAA signaling or b) by the UE with a binding update (BU) in conjunction with MIP6-Request (MIR)/MIP6 Answer (MIA) message. In one example, the AAA can push the blacklist of the CoAs to the respective HA. That is, the HA is bound to the APN that cannot be accessed by the UE from the access technology identified by those CoAs. The AAA when authorizing the binding evaluates the technology bound to CoA and authorizes or denies the binding.

Figure 6:
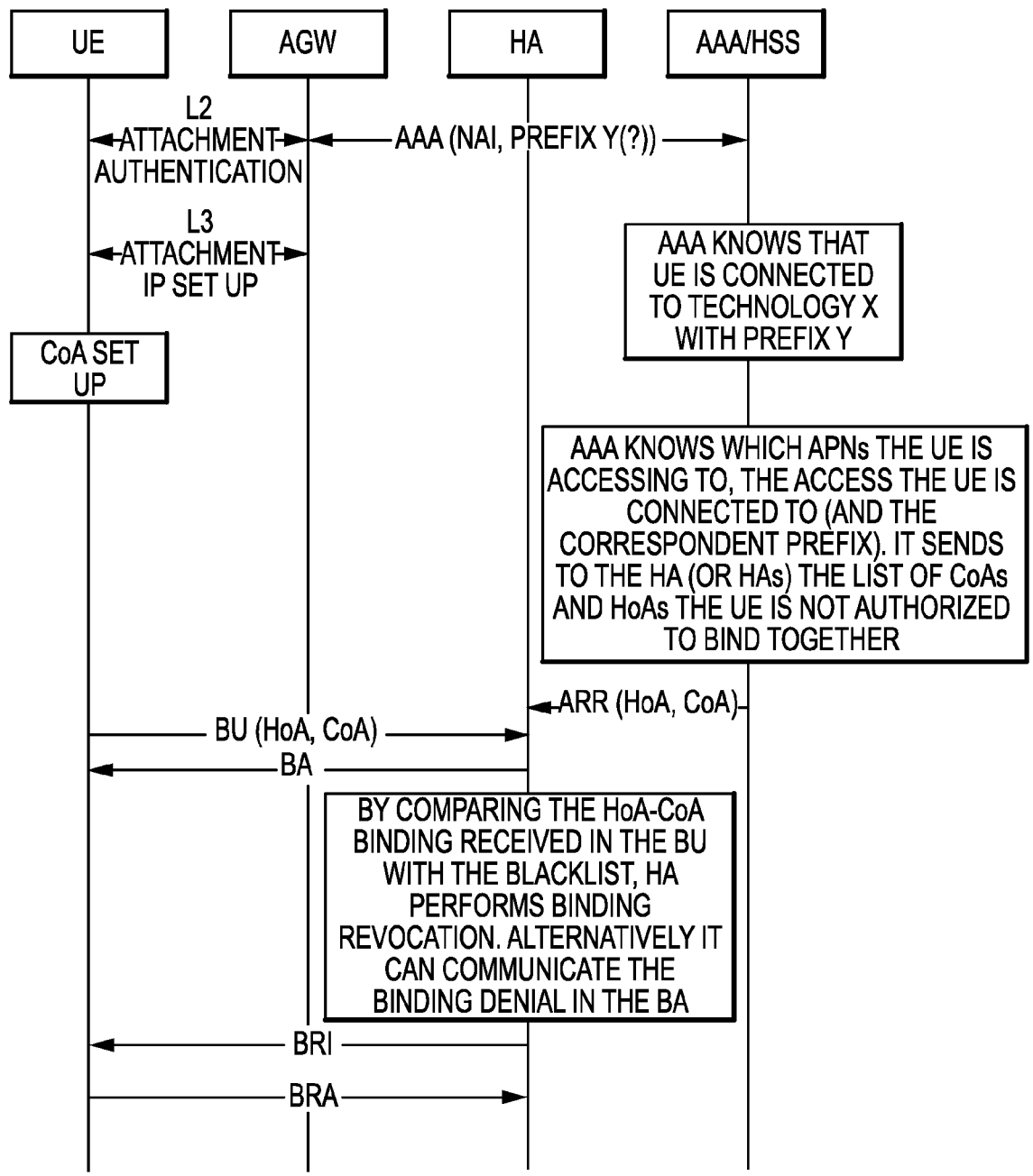
FIG. 6 illustrates an example authentication, authorization, and accounting (AAA) based solution with AAA initiation and where the access gateway (AGW) provides an association between access technology and IP address.
Figure 7:
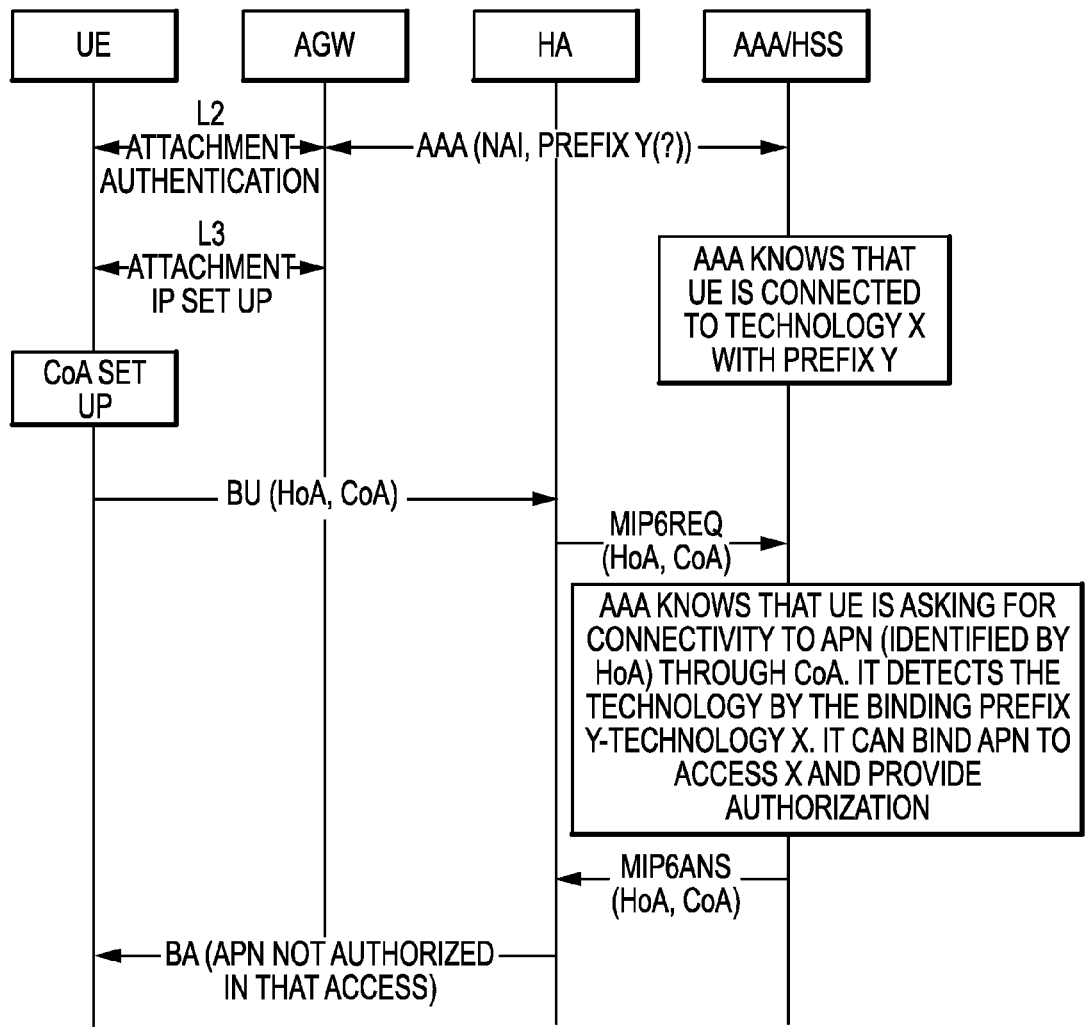
FIG. 7 illustrates an example authentication, authorization, and accounting (AAA) based solution with Home Agent (HA) initiation where the access gateway (AGW) provides an association between access technology and IP address.

FIG. 6 illustrates an example authentication, authorization, and accounting (AAA) based solution with AAA initiation and where the access gateway (AGW) provides an association between access technology and IP address and the AAA pushes the blacklist of the CoAs to the respective HA. FIG. 7 illustrates an example authentication, authorization, and accounting (AAA) based solution with Home Agent (HA) initiation where the access gateway (AGW) provides an association between access technology and IP address.

In an example, further extensions to an AAA based solution may be obtained. NAT may be used where the IP address provided by the AGW is different from the CoA used by the HA. In this case, the address provided by the AGW is the one inserted in the IPv4 CoA option by the UE. HA and PCRF can use this information to perform authorization of APN in a defined access. In another example, the AGW does not always know the IP address assigned to the UE, for example when DHCPv4 is used, when the UE is performing access authorization. Additional message exchange between the AGW and AAA may be required after the AGW knows the IP address of the UE. In the case of an association between an IP address and technology provided by the UE, some ciphering is required between the AGW and UE.

In one example, the communication of the association between the CoA and the technology can be UE initiated with the usage of extensions to binding updates messages. In this case the HA after receiving the BU sends in turn a MIR message to the AAA server communicating the technology bound to the CoA. Such approach implies that when one only HA is deployed the AAA initiated solution cannot be used. However, a hybrid approach, with both AAA and HA initiation, may be used and is helpful when multiple HAs are used by the UE. For example, a HA may send MIPv6 binding authorization request to the AAA and the AAA may deny binding by answering the message. The AAA may extract the CoA and the access technology the UE is using. Subsequently, the AAA may push to the other HAs the CoAs, if this cannot be used to access other APNs.

Figure 8:
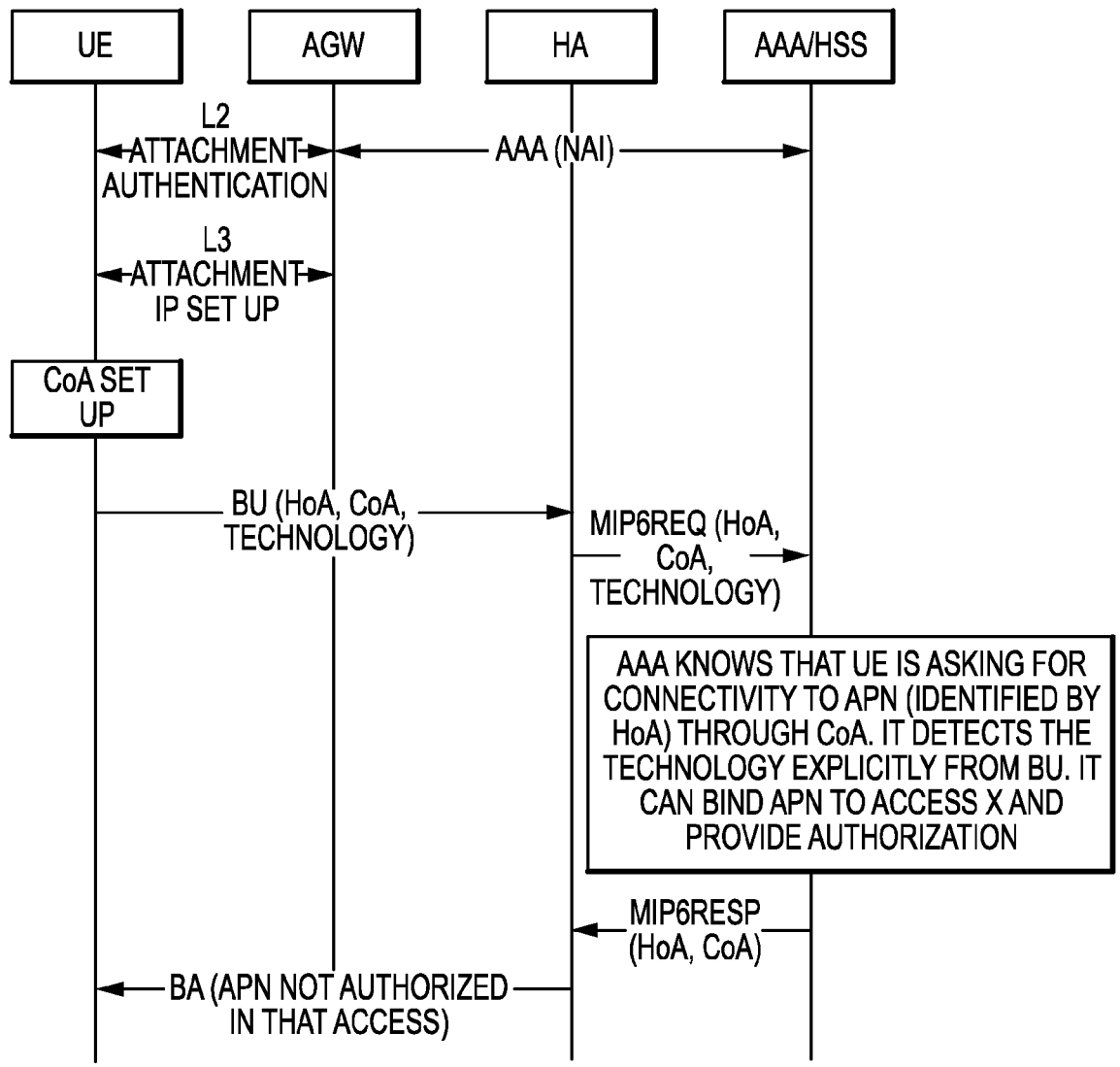
FIG. 8 illustrates an example authentication, authorization, and accounting (AAA) based solution with Home Agent (HA) initiation where the user equipment (UE) provides an association between access technology and IP address.

FIG. 8 illustrates an example authentication, authorization, and accounting (AAA) based solution with Home Agent (HA) initiation where the user equipment (UE) provides an association between access technology and IP address.

In one example, an additional solution may be provided where the AGW receives from the PCRF the blacklist of HAs that the UE cannot use when connected to it. In one instance, when the UE sends a binding update (BU) to a blacklisted HA, the AGW filters the BU which does not reach the HA.

Figure 9:
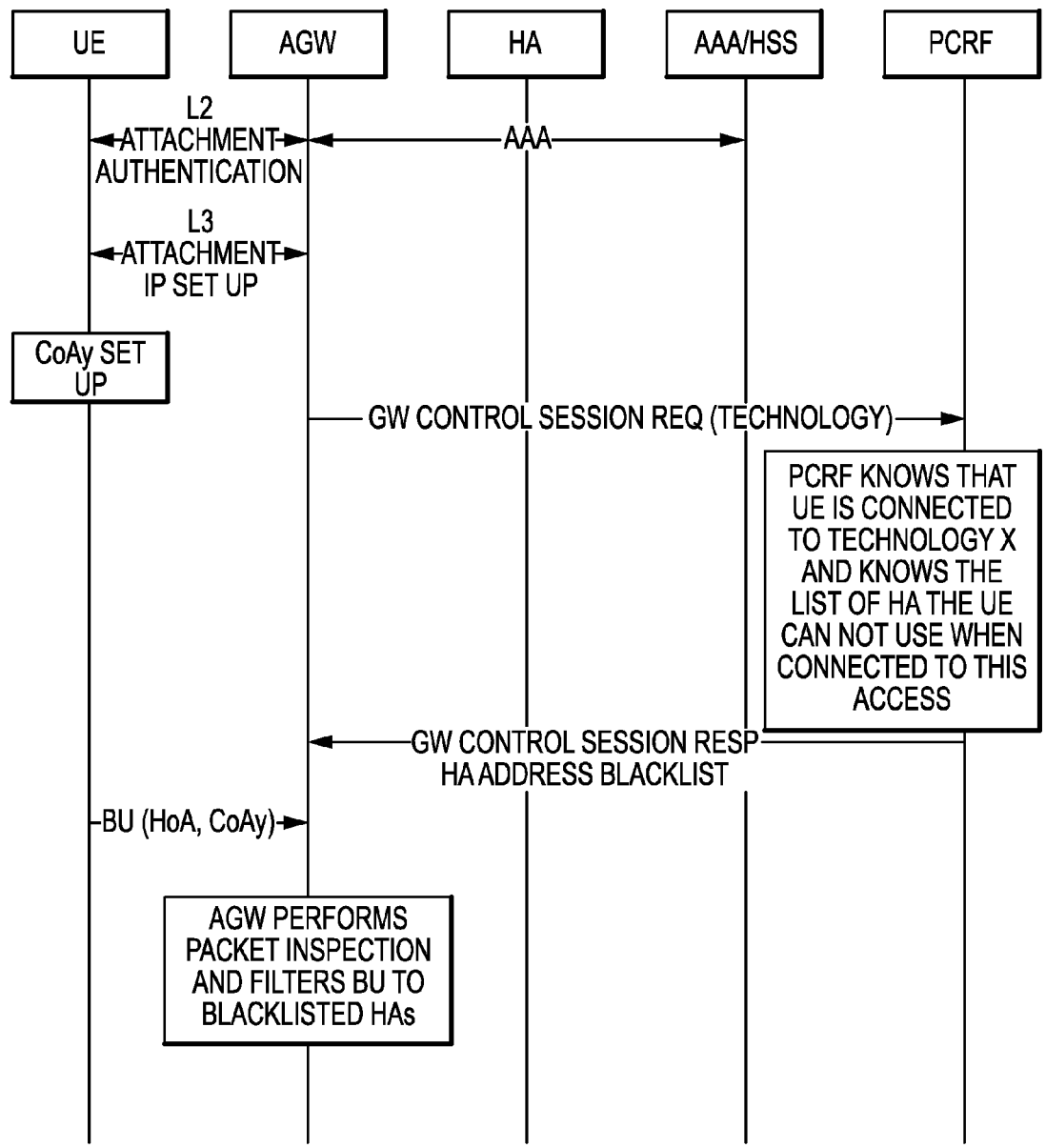
FIG. 9 illustrates an example additional authorization solution where the access gateway (AGW) receives the blacklist of Home Agents (HAs) from the policy and charging rules function (PCRF).

FIG. 9 illustrates an example additional authorization solution where the access gateway (AGW) receives the blacklist of Home Agents (HAs) from the policy and charging rules function (PCRF).

Figure 10:
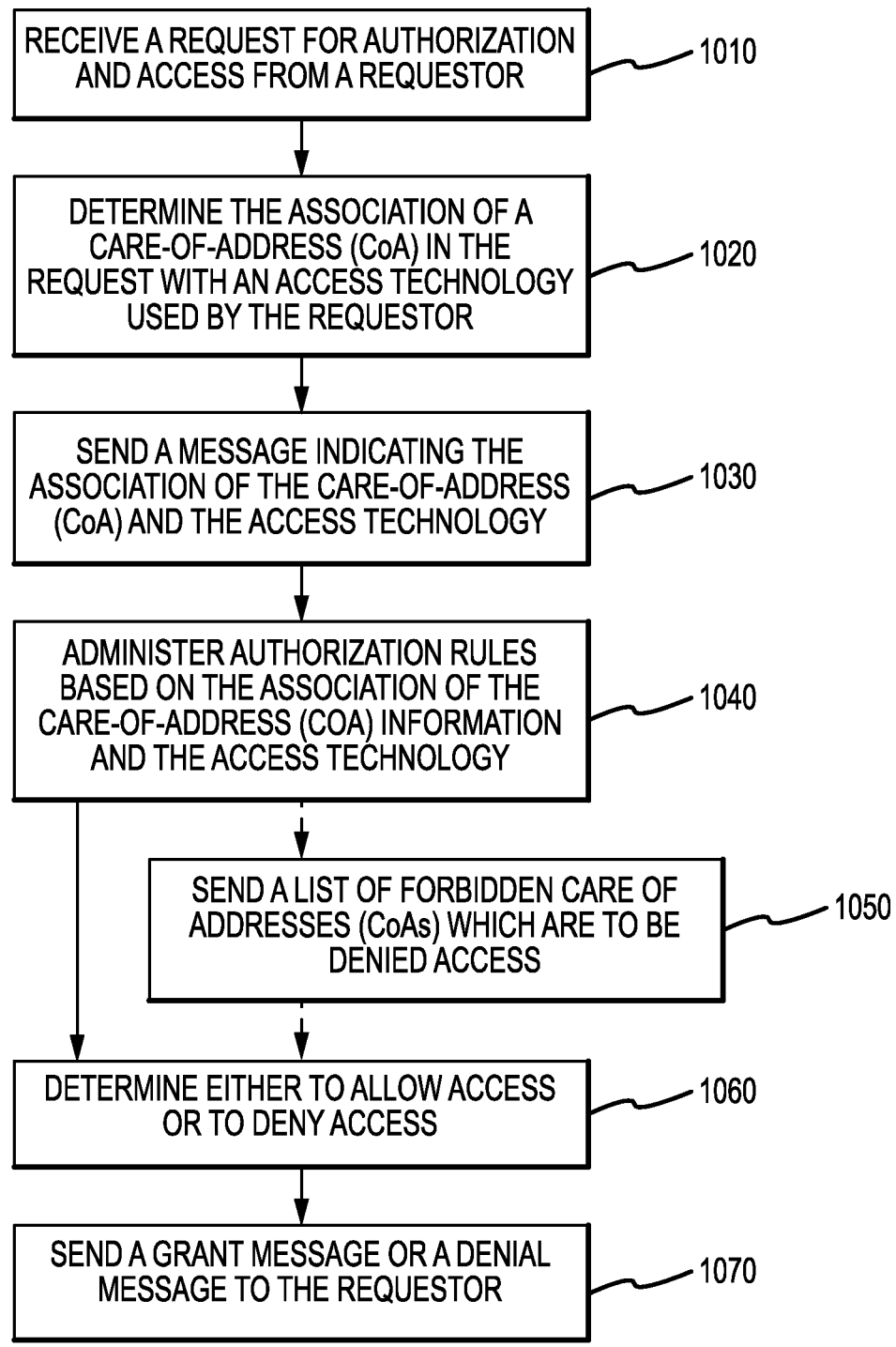
FIG. 10 illustrates an example flow diagram for providing authorization for access point name (APN) usage in a specific access.

FIG. 10 illustrates an example flow diagram for providing authorization for access point name (APN) usage in a specific access. In block 1010, receive a request for authorization and access from a requestor. In one example, a receiver is used to receive the request. In one aspect, a user equipment (i.e., mobile user device) in the network generates the request for authorization and access. That is, the user equipment is the requestor. In another example, the request is received by an access gateway (AGW) in the network. Following receipt of the request, in block 1020, determine the association of a care-of-address (CoA) in the request with an access technology used by the requestor. The care-of-address (CoA) is that of the device making the request for authorization and access, for example, the user equipment or mobile user device. In one example, the care-of-address (CoA) is replaced by the IP address of the device making the request with an access technology. In one example, the access gateway (AGW) makes the determination of the association. Examples of the access technology include, but is not limited to, wireless LAN, wired access, frequency division multiple access (FDMA), orthogonal frequency division multiple access (OFDMA), code division multiple access (CDMA), time division multiple access (TDMA), space division multiple access (SDMA), etc.

In block 1030, send a message indicating the association of the care-of-address (COA) and the access technology. In one example, a transceiver is used to send the message. In another example, the message is sent by the access gateway (AGW) to a policy and charging rules function (PCRF) subsystem. In one example, the policy and charging rules function (PCRF) subsystem is part of a policy and charging control (PCC) subsystem. In another example, the message is sent by the access gateway (AGW) to an authentication, authorization, and accounting (AAA) subsystem.

In block 1040, administer authorization rules based on the association of the care-of-address (CoA) and the access technology. In one aspect, the authorization rules are predetermined and imported into the policy and charging rules function (PCRF) subsystem. In another aspect, the authorization rules are predetermined and imported into the authentication, authorization, and accounting (AAA) subsystem. One skilled in the art would understand that the scope and spirit of the present disclosure is not limited to specific authorization rules since the authorization rules may be based on particular operating characteristics, designer choice, type of access technology, CoA information, etc.

Following block 1040, in block 1050, send a list of forbidden care of addresses (CoAs) which are to be denied access, for example, to a Home Agent (HA) which will in turn grant or deny access. In one example, a transceiver is used to send the list. In one aspect, the forbidden CoAs are predetermined. Also, the forbidden CoAs are also known as (a.k.a.) blacklisted CoAs. The step in block 1050 is an optional step.

In block 1060, determine either to allow access or to deny access using the administering results from block 1040. In one aspect, a processing unit, for example, in either a policy and charging rules function (PCRF) subsystem or a authentication, authorization, and accounting (AAA) subsystem performs the step in block 1060. Following block 1060, in block 1070, send a grant message or a denial message to the requestor. In one example, the grant or denial message is sent by a Home Agent (HA), for example using a transceiver, to the user equipment (i.e., mobile user device) which made the request. The Home Agent (HA) is given the results from administering the authorization rules. In one example, the results from administering the authorization rules is carried on an IP connectivity access network (CAN) response to the Home Agent (HA), for example, from the policy and charging rules function (PCRF) subsystem or the authentication, authorization, and accounting (AAA) subsystem.

One skilled in the art would understand that the steps disclosed in the example flow diagram in FIG. 10 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 11:
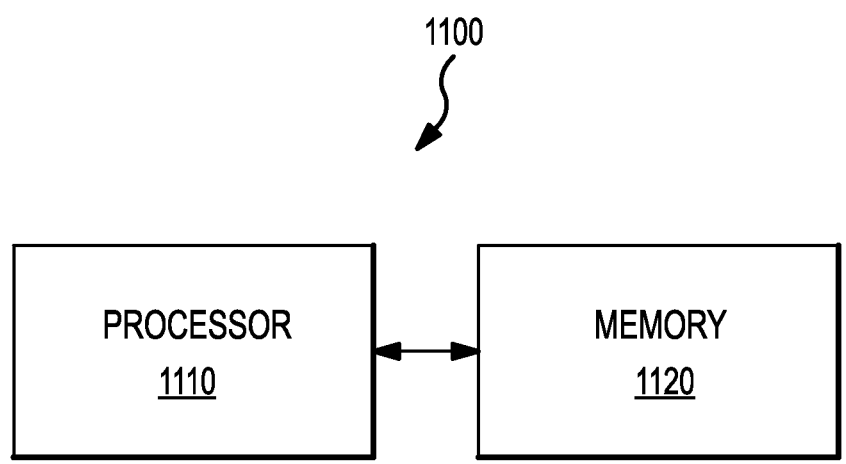
FIG. 11 illustrates an example of a device comprising a processor in communication with a memory for executing the processes for providing authorization for access point name (APN) usage in a specific access.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 11 illustrates an example of a device 1100 comprising a processor 1110 in communication with a memory 1120 for executing the processes for providing authorization for access point name (APN) usage in a specific access. In one example, the device 1100 is used to implement the algorithm illustrated in FIG. 10. In one aspect, the memory 1120 is located within the processor 1110. In another aspect, the memory 1120 is external to the processor 1110. In one aspect, the processor includes circuitry for implementing or performing the various flow diagrams, logical blocks and/or modules described herein.

Figure 12:
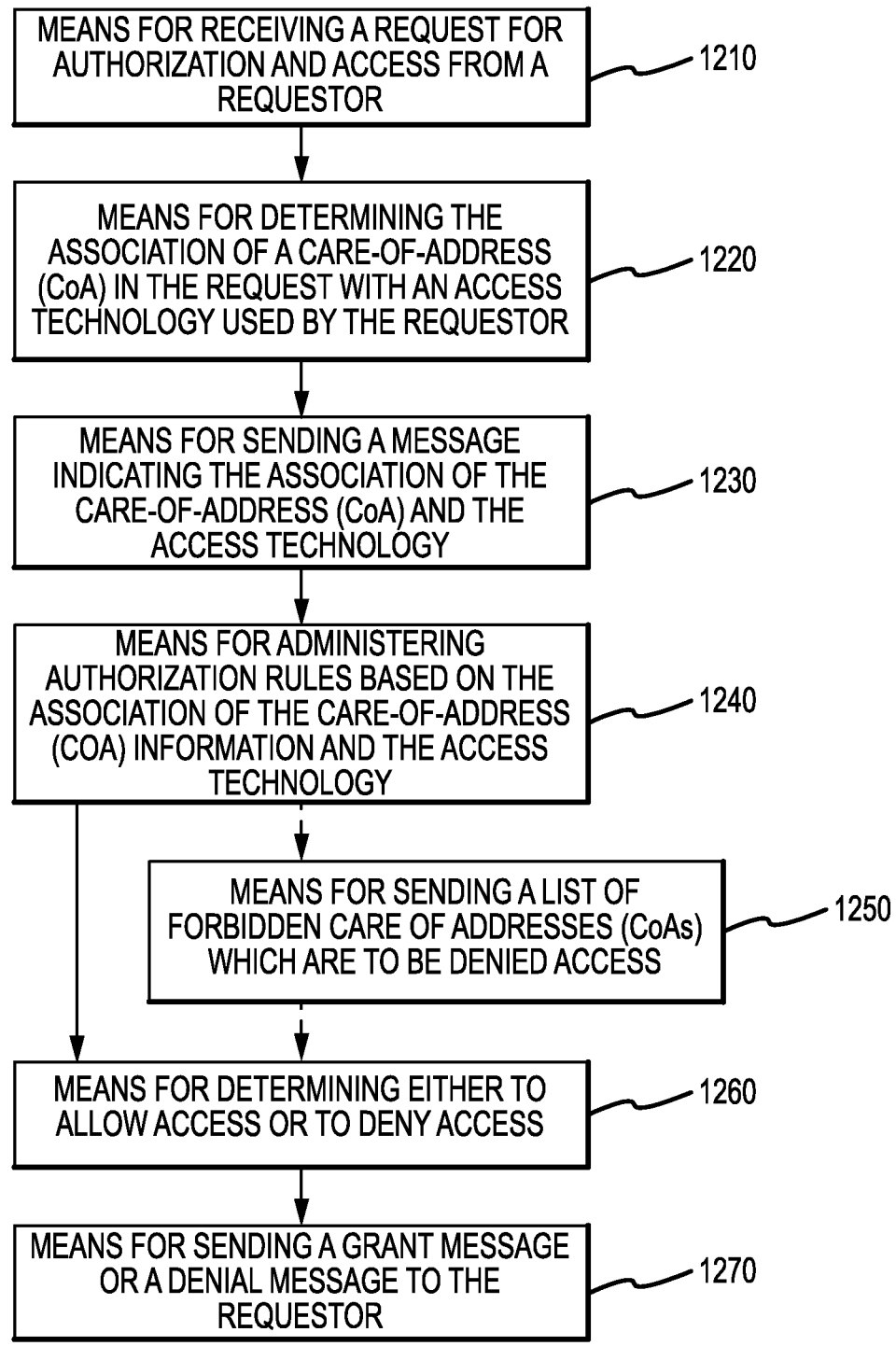
FIG. 12 illustrates an example of a device suitable for providing authorization for access point name (APN) usage in a specific access.

FIG. 12 illustrates an example of a device 1200 suitable for providing authorization for access point name (APN) usage in a specific access. In one aspect, the device 1200 is implemented by at least one processor comprising one or more modules configured to provide different aspects of providing authorization for access point name (APN) usage in a specific access as described herein in blocks 1210, 1220, 1230, 1240, 1250, 1260 and 1270. For example, each module comprises hardware, firmware, software, or any combination thereof. In one aspect, the device 1200 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for providing authorization for access point name (APN) usage in a specific access, the method comprising:
using a receiver for receiving a request from a requester, wherein the request is for authorization and access to the APN, wherein the request comprises a care-of-address (CoA) of the requestor;
determining an access technology type used by the requestor based on the CoA;
administering at least one authorization rule to authorize access to the APN based on the access technology type used by the requestor, comprising:
obtaining a blacklist of forbidden CoAs each associated with a corresponding access technology type; and
determining to allow or deny access to the APN is based on whether the CoA is one of the forbidden CoAs on the blacklist; and
using a processing unit for determining either to allow access or to deny access to the requestor using results from the administering step.

2. The method of claim 1 further comprising sending either a grant message to allow access or a denial message to deny access.

3. The method of claim 2 further comprising sending a message indicating the association of the care-of-address (CoA) and the access technology type.

4. The method of claim 3 wherein the message indicating the association is sent to a policy and charging rules function (PCRF) subsystem or to an authentication, authorization, and accounting (AAA) subsystem.

5. The method of claim 3 further comprising sending a list of the forbidden care of addresses (CoAs) which are to be denied access to a Home Agent (HA).

6. The method of claim 1 wherein results of the administering step are sent to a Home Agent (HA) and the results are carried on an IP connectivity access network (CAN) response to the Home Agent (HA).

7. The method of claim 1 wherein the requestor is a mobile user device and the care-of-address (CoA) identifies the mobile user device.

8. The method of claim 7 wherein the access technology type is one of the following: a wireless local area network (WLAN), a wired access, a frequency division multiple access (FDMA), an orthogonal frequency division multiple access (OFDMA), a code division multiple access (CDMA), a time division multiple access (TDMA) or a space division multiple access (SDMA).

9. The method of claim 7 wherein the care-of-address (CoA) is an IP address for the mobile user device.

10. An apparatus for providing authorization for access point name (APN) usage in a specific access, the apparatus comprising
a receiver for receiving a request from a requester, wherein the request is for authorization and access to the APN, wherein the request comprises a care-of-address (CoA) of the requestor; and
a processor coupled to a memory, wherein the memory contains program code executable by the processor for performing the following:
determining an access technology type used by the requestor based on the CoA;
administering at least one authorization rule to authorize access to the APN based on the access technology type used by the requestor, comprising:
obtaining a blacklist of forbidden CoAs each associated with a corresponding access technology type; and
determining to allow or deny access to the APN is based on whether the CoA is one of the forbidden CoAs on the blacklist; and
using a processing unit for determining either to allow access or to deny access to the requestor using results from administering the at least one authorization rule.

11. The apparatus of claim 10 further comprising a transceiver for sending either a grant message to allow access or a denial message to deny access.

12. The apparatus of claim 11 wherein the transceiver also sends a message indicating the association of the care-of-address (CoA) and the access technology type.

13. The apparatus of claim 12 wherein the message indicating the association is sent to a policy and charging rules function (PCRF) subsystem or to an authentication, authorization, and accounting (AAA) subsystem.

14. The apparatus of claim 12 wherein the transceiver also sends a list of the forbidden care of addresses (CoAs) which are to be denied access to a Home Agent (HA).

15. The apparatus of claim 10 wherein results from administering the at least one authorization rules are sent to a Home Agent (HA) using a transceiver, and the results are carried on an IP connectivity access network (CAN) response to the Home Agent (HA).

16. The apparatus of claim 10 wherein the requestor is a mobile user device and the care-of-address (CoA) identifies the mobile user device.

17. The apparatus of claim 16 wherein the access technology type is one of the following: a wireless local area network (WLAN), a wired access, a frequency division multiple access (FDMA), an orthogonal frequency division multiple access (OFDMA), a code division multiple access (CDMA), a time division multiple access (TDMA) or a space division multiple access (SDMA).

18. The apparatus of claim 16 wherein the care-of-address (CoA) is an IP address for the mobile user device.

19. An apparatus for providing authorization for access point name (APN) usage in a specific access, the apparatus comprising:
means for receiving a request from a requester, wherein the request is for authorization and access to the APN, wherein the request comprises a care-of-address (CoA) of the requestor;

means for determining an access technology type used by the requestor based on the CoA;

means for administering at least one authorization rule to authorize access to the APN based on the access technology type used by the requestor, comprising:

means for obtaining a blacklist of forbidden CoAs each associated with a corresponding access technology type; and means for determining to allow or deny access to the APN is based on whether the CoA is one of the forbidden CoAs on the blacklist; and means for determining either to allow access or to deny access to the requestor using results from administering the at least one authorization rule.

20. A non-transitory computer-readable medium storing a computer program, wherein execution of the computer program is for:

receiving a request from a requester, wherein the request is for authorization and access to an APN, wherein the request comprises a care-of-address (CoA) of the requestor;

determining an access technology type used by the requestor based on the CoA;

administering at least one authorization rule to authorize access to the APN based on the access technology type used by the requestor, comprising:

obtaining a blacklist of forbidden CoAs each associated with a corresponding access technology type; and determining to allow or deny access to the APN is based on whether the CoA is one of the forbidden CoAs on the blacklist; and determining either to allow access or to deny access to the requestor using results from administering the at least one authorization rule.

21. The method of claim 1, wherein the authorization rule is an APN-specific rule for authorizing access by a specific access technology type.

22. The apparatus of claim 10, wherein the authorization rule is an APN-specific rule for authorizing access by a specific access technology type.

23. The apparatus of claim 19, wherein the authorization rule is an APN specific rule for authorizing access by a specific access technology type.

24. The computer readable medium of claim 20, wherein the authorization rule is an APN-specific rule for authorizing access by a specific access technology type.

25. The apparatus of claim 19, further comprising a means for sending either a grant message to allow access or a denial message to deny access.

26. The apparatus of claim 25, wherein the means for sending is further configured to send a message indicating the association of the care-of-address (CoA) and the access technology type.

27. The computer-readable medium of claim 20, wherein execution of the computer program is further for sending either a grant message to allow access or a denial message to deny access.

28. The computer-readable medium of claim 27, wherein execution of the computer program is further for sending a message indicating the association of the care-of-address (CoA) and the access technology type.

* * * * *